United States Patent [19]

Shannon

[11] 4,278,720
[45] Jul. 14, 1981

[54] BONDED MAT OF DIRECTIONALLY ORIENTED STRANDS AND RANDOMLY ORIENTED STRANDS

[75] Inventor: Richard F. Shannon, Lancaster, Ohio

[73] Assignee: Owens-Corning Fiberglas Corporation, Toledo, Ohio

[21] Appl. No.: 35,199

[22] Filed: May 2, 1979

[51] Int. Cl.³ .............................................. B32B 5/12
[52] U.S. Cl. .................................. 428/109; 428/113; 428/198; 428/285; 428/288; 428/292; 428/293; 428/295
[58] Field of Search ............... 428/198, 268, 273, 301, 428/302, 299, 251, 252, 109, 113, 107, 292, 293, 295, 285, 288

[56] References Cited

U.S. PATENT DOCUMENTS

| | | | |
|---|---|---|---|
| 2,566,960 | 4/1951 | Phillipps | 428/378 |
| 2,577,214 | 12/1951 | Slayter | 154/46 |
| 2,609,319 | 9/1952 | Boge | 428/273 |
| 2,639,759 | 5/1953 | Simison | 154/28 |
| 2,704,734 | 3/1955 | Draper et al. | 154/93 |
| 2,705,686 | 4/1955 | Ness et al. | 428/198 |
| 2,765,248 | 10/1956 | Beech et al. | 428/273 X |
| 2,790,741 | 4/1957 | Sonneborn et al. | 154/101 |
| 3,044,146 | 7/1962 | Thomas et al. | 428/273 X |
| 3,952,124 | 4/1976 | Mesek | 428/301 X |
| 4,135,029 | 1/1979 | Pfeffer | 428/284 |
| 4,139,591 | 2/1979 | Jurisich | 428/268 X |

Primary Examiner—Marion McCamish
Attorney, Agent, or Firm—Ronald C. Hudgens; Charles F. Schroeder; William P. Hickey

[57] ABSTRACT

A bonded mat which can be stretched over projections without excessive thinning out and which permits fiber loadings of greater than 25 percent by volume. The mat includes directionally oriented strands held together by swirled strands or randomly oriented fibers, and all of which are permanently held together by a binder.

3 Claims, 5 Drawing Figures

1

BONDED MAT OF DIRECTIONALLY ORIENTED STRANDS AND RANDOMLY ORIENTED STRANDS

BACKGROUND OF THE INVENTION

Glass fiber mat for reinforcing plastics has been made for many years in two principle forms, one being chopped strand mat, and the other being swirl continuous strand mat. In both mats, the fiber of the strands are held together by a size and the strands are in turn bonded together by a small amount of organic binder which softens or sometimes dissolves to some degree in later applied organic impregnating resin; so that the strands become unbonded to allow the mat to stretch over projections during the molding or during the hand lay up process. It turns out that the maximum amount of randomly oriented strand that can be impregnated with resin or a molding compound is about 25% by volume. Glass fibers are very strong and they provide a major portion of the strength of the finished molded product. The prior art has long known that if the fibers could be laid parallely that the strength of the finished product, at least in one direction, would be greatly increased. This fact has been made use of in the filament winding process, wherein the strands are tightly wound onto a mandrel while they are wetted with a liquid resin to give products wherein the glass fibers may comprise 50% by volume or more of the finished product. The process produces generally cylindrical envelopes having great hoop strength, as is necessary in pipes and tanks. Additionally, circumferentially extending strips have been cut from the envelopes for automotive bumpers and the like.

An object of the present invention is the provision of a new and improved mat which will give a fiber loading of greater than 25% by volume and which can be stretched or bent during the molding, or part forming operation without having the mat "thin out" detrimentally when pulled over projections of a mold.

Another object of the present invention is the provision of a new and improved mat which will provide molded parts having greater strength in predetermined directions at predetermined fiber loadings than has been possible with prior art mats.

Another object of the present invention is the provision of a new and improved mat having parallely oriented fibers which do not separate during molding over projections.

A further object of the present invention is the provision of a new and improved sheet molding compound having a mat therein with generally parallely oriented fibers and which can be molded into complicated shapes without separation of the parallely oriented fibers.

Further objects and advantages of the present invention will become apparent to those skilled in the art to which the invention relates from the following description of the preferred embodiments.

DESCRIPTION OF THE PREFERRED EMBODIMENTS

As previously explained, the prior art mats have been limited in the volume of glass fibers which they can contribute to a fiber-binder composite. The prior art has had difficulty in utilizing parallel fibers in molding processes since the parallel fibers separate and leave unreinforced areas on the sections where they are stretched over the projecting surfaces of a mold. According to principles of the present invention, a mat is provided which increases the amount of glass fibers in a given volume of mat and which does not "thin out" detrimentally when stretched over projections of a mold.

EXAMPLE 1

Figure 1:
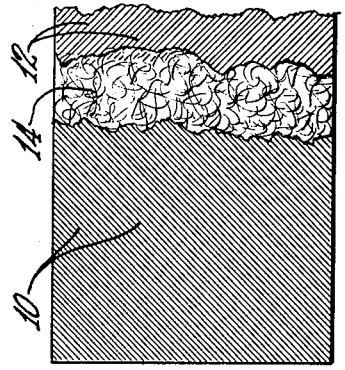
FIG. 1 is a fragmentary plan view of a mat having two layers of parallel strands that extend at an angle of 90° to each other and which are bonded to opposite sides of a swirl mat.

The embodiment of mat shown in FIG. 1 generally comprises two layers 10 and 12 of parallel strands on each surface of a layer of continuous strand swirl mat 14. The strands of layers 10 and 12 are arranged in a side by side generally touching arrangement with the strands of each layer making an angle of 45° to the longitudinal axis of the mat. The layers 10 and 12 crisscross each other at 90° and are bonded to the swirl mat in such a manner that they do not shift without moving the swirl mat therewith. In the embodiment shown in the drawing, both the swirl mat strand and the continuous strands are sized with the following materials at forming:

| Materials | Desirable % by Wt. | Preferred % by Wt. |
|---|---|---|
| Unsaturated Polyester Resin 1 mol phthalic anhydride, 1 mol maleic anhydride, 2 mol propylene glycol cooked to an acid number of 30–35 | 5 to 15 | 8.4 |
| Solvent | optional | 3.6 |
| Emulsifying Agent *Pluronic F77 | 0.8 to 4.5 | 1.09 |
| Coupling Agent Gamma methacryloxypropyltrimethoxysilane | 0.3 to 3 | 0.50 |
| Acid for pH Control Glacial Acetic Acid | 0.01 to 4.0 | 0.04 |
| Cationic Lubricant **AHCO 185 AE | 0.10 to 5 | 0.126 |
| AHCO 185 AN | | 0.054 |
| Saturated Polyester Resin 1 mol phthalic anhydride, 1 mol succinic anhydride, 2.3 mols propylene glycol cooked to an acid number of 35 to 40 | 0.34 to 1.5 | 0.70 |
| Water | | Balance |

*Pluronic F77 is a trade name of Wyandotte Chemical Corp. for a condensate of ethylene oxide with a hydrophobic base formed by condensing propylene oxide with propylene glycol.
**AHCO 185 AE is a trade name of Arnold Hoffman Co. for the reaction product of tetraethylene pentamine and pelargonic acid and solubilized with acetic acid. AHCO 185 AN is a trade name of Arnold Hoffman Co. for the reaction product of tetraethylene pentamine and caprylicacid solubilized with acetic acid.

One-tenth of the emulsifying agent is added to the saturated polyester resin and thoroughly mixed therewith, and the remainder of the emulsifying agent is added to a separate container holding the unsaturated polyester resin and is thoroughly mixed therewith. Thereafter, one tenth of the water is placed in a container that is agitated by an Eppenbach mixer, and the saturated polyester resin is slowly added thereto. The balance of the water is placed in another container that is agitated by an Eppenbach mixer and the unsaturated resin mix is slowly added thereto. The glacial acetic acid is added to the coupling agent and thoroughly mixed therewith, and the hydrolyzed coupling agent thus formed is then added to the emulsion of the unsaturated resin. The emulsion of the saturated resin is then added to the emulsion of the unsaturated resin with mixing, and the cationic lubricants are added and thoroughly dissolved therein.

A plurality, i.e. 408 molten streams of glass are attenuated to a diameter less than 0.0008 inch and preferably approximately 0.00036 inch and are immediately pulled over a roll-type applicator that is coated with the above described coating material. The fibers, thereafter, are brought together into a strand and wound upon a winding drum to form a coiled package, following which the coiled package is dried. A plurality of these packages are then placed on a creel and the ends rolled onto a single mandrel to produce a beam. Sufficient ends are used to provide the necessary beam width for layers 10 and 12.

In the manufacture of the swirl mat 14, continuous strands are fed down onto a slowly moving conveyor where the strands are deposited in coils that become bonded together in a later curing step. Any suitable process can be used as for example that taught in U.S. Pat. No. 2,875,503 or U.S. Pat. No. 3,547,762. Preferably a polyester binder is used in place of the aldehyde condensate binder used in U.S. Pat. No. 3,547,762, and such a binder may be similar to the size formulation given above except that the saturated polyester resin is omitted. An amount of binder will be used to provide a dry mat containing between approximately 8% to 15% of binder.

The mat shown in FIG. 1 can be made in a number of ways, one of which is by means of the envelope forming machine shown and described in U.S. Pat. No. 3,655,489. Using this machine, two layers of swirl mat, each having a width equal to one half of the circumference of the mandrel of the machine are wrapped onto the mandrel with one layer centered on the edge of the other layer. Thereafter, a beam of the continuous strand is coiled onto the mandrel at an angle of 45 degrees. In order to do this, the beam must have a width that is equal to one half of the circumference. Before the strands from the beam are fed onto the mandrel, they are passed through a bath of styrene thinned polyester resin of the type described for the swirl mat above, but containing a curing agent, so that they are applied to the swirl mat when wet. The wet strands, of course, wet out the strands of swirl mat which they touch, and following which the mat composite is bonded together by passing beneath suitable infrared heaters. After being dried and bonded together, the cylindrical mat so made is taken from the machine and is flattened. The flattened envelope is coiled onto a transverse mandrel that is rotated end for end at the same velocity as is the mandrel of the envelope forming machine. In most instances, the flattened envelope will be used as such, but in some instances, the side edges may be split to produce two layers of swirl mat, each having a single layer of parallel strands thereon.

The above procedure may be repeated excepting that the swirl mat may be replaced with a chopped strand mat, the chopped strands of which are bonded together sufficiently well that it can be fed to the envelope making machine.

EXAMPLE 2

Figure 2:
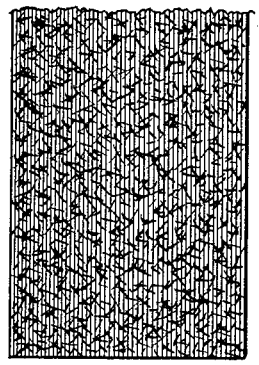
FIG. 2 is a fragmentary plan view similar to FIG. 1 but showing a single layer of parallel oriented strands bonded to chopped strands.

The mat shown in FIG. 2 of the drawings comprises a layer of chopped strand mat having a layer of continuous parallel strands in touching engagement with each other, and bonded onto the surface of the chopped strand mat. Any suitable binder may be utilized, as for example, that given in Example 1.

The mat of FIG. 2 may be made in a number of ways, one of which is to prepare a beam of continuous strand that are in substantially touching engagement by placing the necessary packages of continuous strand on a creel and winding the ends from the packages onto a mandrel to prepare the beam. Prior to winding the material on the mandrel to form the beam, they may be wetted with a solvent, and then dried, to tack the continuous strand in parallel engagement. Therafter, the beam of continuous strand may be fed to the moving conveyor of the apparatus described in U.S. Pat. No. 2,790,741, and chopped strand deposited on top of the continuous strands. A spray of solvent thinned binder can be applied to the chopped strand to wet the chopped strand and the continuous strand, following which a curing operation will adhere all strands together into a bonded mat.

EXAMPLE 3

Figure 3:
FIG. 3 is a sectional view similar to FIG. 1, but showing the mat of FIG. 1 having a layer of veil fibers on each major surface.

The mat shown in FIG. 3 of the drawings is generally the same as the mat shown in FIG. 1, excepting that it has two layers of veil mat, one on each of the major surfaces of the mat shown in FIG. 1.

Such a mat can be made in a number of ways, one of which is to feed a layer of commercial veil mat of a width equal to one half that of the mandrel of the envelope forming machine over the top of the continuous strands of Example 1. The veil mat is suitably sprayed or otherwise dampened with a binder solution, as for example, that previously described. After the envelope is made and flattened, it will have veil mat on both of its surfaces. The veil mat will be bonded tightly to the rest of the structure.

Veil mat is a mat of monofilaments that are sprayed with a binder and deposited onto a conveyor in a random orientation. The binder is dried to adhere the monofilaments together in the same manner as is the swirl mat or chopped strand mat. The phenomenon known as fiber imprint is caused when mat is impregnated with a molding compound and the molding compound is cured. Shrinkage of the resin leaves an imprint of the strand, and veil mat has the property of greatly reducing "fiber imprint."

EXAMPLE 4

Figure 4:
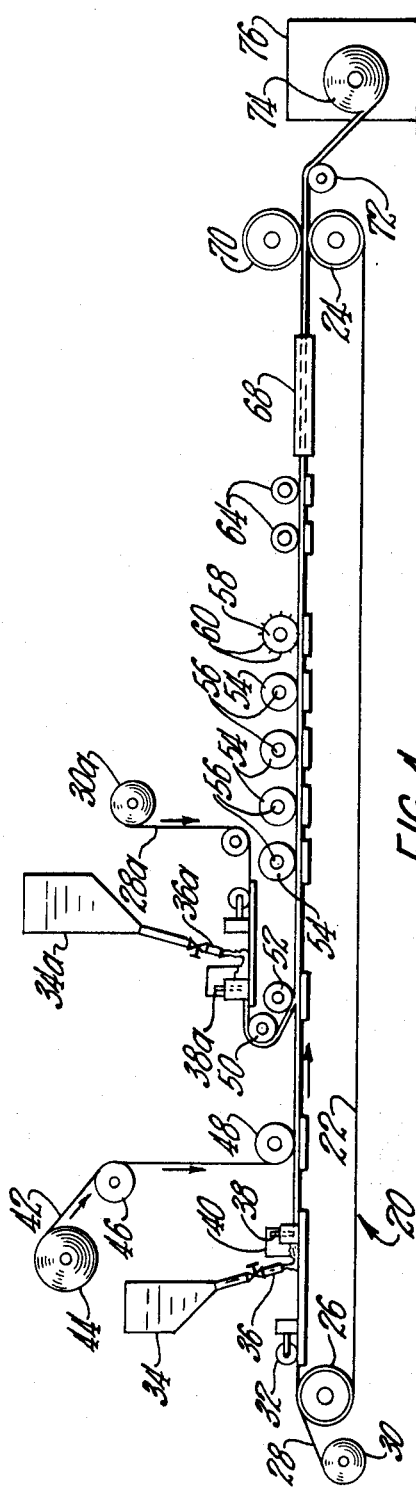
FIG. 4 is a schematic side view of equipment for making sheet molding compounds from the mats of the present invention.

A sheet molding compound can be made from any of the mats above described. One such process is shown in FIG. 4.

A resin-filler paste is first made of the following materials:

| Material | Desirable % by Wt. | Preferred % by Wt. |
|---|---|---|
| Resin having crosslinkable | 25 to 95 | |

-continued

| Material | Desirable % by Wt. | Preferred % by Wt. |
| --- | --- | --- |
| Olefinic Double Bonds | | |
| Unsaturated resin used above | | 42.7 |
| Catalyst for Cross-linking D. B. | 0.1 to 5 | |
| Dicumyl peroxide | | 0.85 |
| 2,5-dimethyl hexyl-2,5 di (peroxybenzoate) | | 0.09 |
| Mold Release Agent | 0 to 5 | |
| Zinc Stearate | | 1.71 |
| Gelling Agent (Alkaline Earth Metal oxide) | 0.2 to 10 | |
| Ca(OH)$_2$ | | 1.28 |
| Solvent | optional | |
| Styrene monomer | | 4.27 |
| Fillers | 0 to 75 | |
| Resin type (microethylene | | 6.4 |
| Nonresinous filler (CaCO$_3$) | | 43.7 |

The resin-filler paste is prepared by charging the resin to a Cowles type mixer. The 2,5-dimethyl hexyl-2,5-di(peroxybenzoate) dissolved in approximately half of the styrene is blended with the resin. Thereafter, the dicumyl peroxide and mold release agent are added. The resin type filler is then blended in, following which the nonresinous filler is likewise added and thoroughly dispersed. Immediately before the resin-filler paste is to be used in making the sheet molding compound, a slurry of the gelling agent in the other half of the styrene is added and mixed for approximately three minutes.

The apparatus shown in FIG. 4 for making the sheet molding compound has an endless belt conveyor 20, the belt 22 of which extends around head and tail pulleys 24 and 26 respectively. Sheet material 28, as for example, a polyethylene sheet, is uncoiled from a roll 30 and is advanced to the top run of the conveyor 20 through numerous operations. After coming into contact with the belt 22, the film is contacted by a pair of sheet smoothing rolls 32, respective ones of which are positioned adjacent respective sides of the sheet. The smoothing rolls pull the opposite side edges apart and take out wrinkles. Thereafter the resin-filler paste is flooded onto the sheet from a reservoir 34 through a plurality of nozzles 36, following which the paste is contacted by a doctor blade 38 which smoothens the paste to a thickness of approximately one-sixteenth inch. The doctor blade 38 includes edge guides 40 which prevent the paste from coating one inch edge portions of the sheet.

The mat 42 from coiled packages 44 of any of the examples above described is pulled over a direction changing roll 46 down under another direction changing roll 48 to bring the mat on top of the resin coated separation sheet 28. Another strip of sheet material 28a in the present case polyethylene, is uncoiled from a roll and advanced towards the area of fiber deposition from the direction opposite to that of the conveyor movement. The sheet 28a is coated with a layer of resin-filler paste in the same manner previously described for the sheet 28. The parts of the coating apparatus for the sheet 28a which correspond to similar parts of the coating apparatus for the sheet 28 are designated by a like reference numeral characterized further in that a suffix "a" is affixed thereto. The polyethylene sheet 28a with a paste coating of approximately one-sixteenth inch thereon, passes around an idler roll 50 which changes the direction of movement of the sheet 28a to correspond with that of the sheet 28. The film 28a with the past now on its bottom surface is forced down on top of the mat 42 by a squeeze roll 52. The sandwich formed by the two sheets of polyethylene having the paste and mat 42 therebetween is then passed beneath a plurality of discs 54 which roll along the top polyethylene sheet 28a to work the paste into the mat 42. In the embodiment shown in FIG. 4, the discs are arranged in four rows with the discs of respective rows being staggered so that substantially all portions of the paste are kneaded into the mat. The discs of each row are concentrically supported on shafts 56 suitably journaled for rotation. The composite sandwich, thereafter, passes beneath a roll 58 having needle shaped projections 60 thereon which are forced through the sheet 28a and through the paste into the mat. The holes 62 made by the projections 60 allow air that is trapped in the mat to escape, and thereafter, the sandwich is passed beneath a pair of rolls 64 having evenly spaced ridges thereon, which further knead the paste into the mat. The uncoated edge portions of the sheets 28 and 28a are turned over by a pair of folding shoes 68, and the sandwich thereafter is advanced between a pressure roller 70 positioned above the head pulley 24 which assures that the paste is displaced into the openings made by the needlelike projections 60. Thereafter the sandwich passes over an idler roll 72 and is wound into a coiled package 74 by conventional power driven equipment 76, which provides a controlled tension of between three-fourths and one pound per lineal inch of sandwich for densification and wet out.

The sandwich thus made is stored for 2 to 7 days at room temperature, during which time the alkaline earth oxide reacts with acid anhydride radicals of the resin to gel the resin and convert it into a handleable sheet. This sheet is prepared for molding by cutting sections from the roll 74, which sections contain the desired amount of material. The polyethylene sheets are stripped therefrom and the molding compound is placed into the cavity of matched dies. The matched dies are brought together to cause the molding compound to be displaced throughout the cavity, and the compound is cured in the cavity at a temperature of approximately 300° F. for 1 to 2 minutes. A completely acceptable glass fiber reinforced molded article is thus produced in which the molding compound is firmly bonded to the glass fibers.

EXAMPLE 5

The process of Example 4 is repeated excepting that a binder-filler paste of the following composition is utilized to make the sheet molding compound:

| Material | Parts By Weight |
| --- | --- |
| MgO | 539 parts |
| MgCl$_2$ . 6H$_2$O solution (57% solids) | 700 parts |
| Sodium hexametaphosphate | 6 parts |
| Phosphoric acid | 12 parts |
| 1/32 inch hammer milled glass fibers | 75 parts |

The sheet molding compound after being produced is immediately frozen at −40° C. Before molding, the sheets are stripped therefrom. The SMC is molded in a press at 200° F. and 800 PSI for 4 minutes.

EXAMPLE 6

A resin-filler paste of the following composition is used:

| Materials | Parts by Weight |
| --- | --- |
| Filler-Calcium Carbonate minus 100 mesh | 65 |
| Phenol-formaldehyde Resole (65% solids) | 54 |
| Zinc Stearate (mold release agent) | 1 |
| Coupling Agent | |
| Gamma aminopropyltrimethoxysilane | 0.2 |
| Tetraethylorthosilicate | 0.2 |

The resin-filler paste is made by charging the Resole to a Cowles mixer and mixing the zinc stearate, and coupling agents therewith. Thereafter the filler is slowly blended therewith to produce the paste. Any suitable filler can be used, as for example Portland cement, gypsum, clay, silica, wood flour, etc. The paste will preferably have a viscosity below approximately 50,000 centipoise, and a small spray of a solvent such as water or alcohol may be added to the mixer to control the viscosity. It has been found that a viscosity of about 20,000 centipoise will give good impregnation of glass strand mat.

Figure 5:
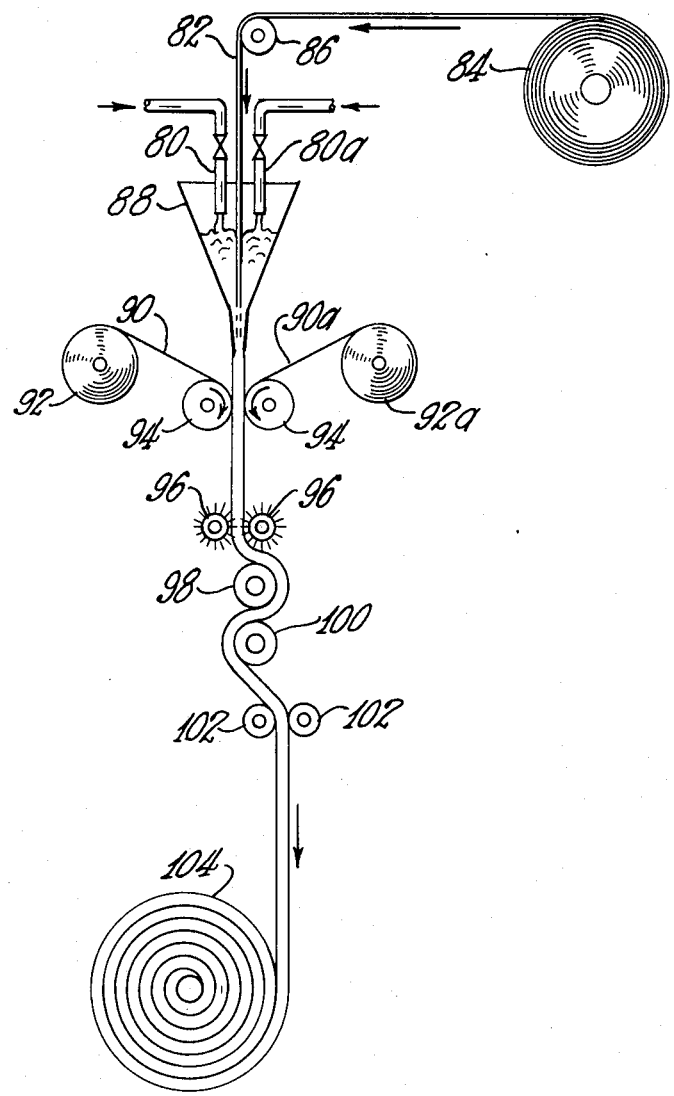
FIG. 5 is a schematic view of another embodiment of equipment for making sheet molding compounds from the mats of the present invention.

The resin filler paste is made into sheet molding compound using the method and apparatus shown schematically in FIG. 5. The paste is pumped through lines 80 and 80a to opposite sides of the bonded mat 82 of the present invention, after it is uncoiled from the roll 84 and passed downwardly around the direction changing roll 86. The paste impinges upon opposite sides of the mat 82 and is worked into the mat by the converging sides of a hopper 88 having a slit in the lower end, through which the mat 82, now impregnated with the paste, passes.

The impregnated mat feeds down between two sheets of polyethylene 90 and 90a, which are uncoiled from rolls 92 and 92a, respectively. The impregnated mat and the polyethylene separation sheets on its surfaces forms a sandwich which passes between the bite of sizing rolls 94 spaced apart a suitable distance to set the thickness of the sandwich produced. The sandwich then passes through the bite between two spiked rollers 96, the spikes of which perforate the separation sheet and penetrate through the layer of mat 82 to provide passages for the removal of trapped air. The perforated sandwich then is flexed between two rolls 98 and 100 having slight ridges thereon to knead the material laterally of the sandwich, and then passes between the bite of a pair of final sizing rolls 102 before passing to the packaging station where it is rolled into a maturation roll 104.

The roll 104 is preferably kept at a temperature below 50° F. until such time as it is molded. The sheet molding compound may be molded under pressure for five minutes between matched metal dies, heated to 350° F. The platens of the press are preferably closed against stops to control thickness, and the press is preferably "bumped" several times during a five minute molding cycle to remove free water. The pressure used to close the press may be between approximately 200 psi and 2000 psi.

Examination of parts so made will show that the mat of the present invention has substantially no thinning out over the projecting surfaces of the mold, as occurs with the prior art mats. There may be a slight gathering in areas around the projections, and in these areas, there will be a slight compression of the mat, but without wrinkles in the finished parts.

The mats of the present invention have the continuous strands bonded to the remaining portions of the mat at the crossover points of the strands by globules of resin so that movement of the continuous strands require the shifting of the swirl mat, or chopped strand mat, or veil mat as the case may be. This being so, when the mat is forced down over irregular shapes, a shifting of the mat without a complete separation of the continuous strands occurs. The mat of the present invention, therefore, gives reinforcing over projections of a mold; it gives a greater volume of glass fibers per cubic inch of a molded material than is possible with the prior art mats. The binder will comprise between 4.0 and 20% by weight of the mat.

It will now be seen that the mats of the present invention can be used with resin filler paste of substantially any kind, and these parts may be made using either organic resins or inorganic binders. The organic resins may be polyester resins, aldehyde condensate resins, and specifically phenolic resins and melamine resins, acrylic resins, epoxy resins, etc. The inorganic binders may be gypsum or any of the "mag-oxy cements." By "mag-oxy cement" we mean a reaction product formed by reacting a reactive MgO with an acid salt such as $MgCl_2$, $MgSO_4$, $MgCO_3$ and $Mg_3(PO_4)_2$. Magnesium oxychloride, magnesium oxysulphate, and magnesium oxycarbonate are common examples of such cements.

While the invention has been described in considerable detail, I do not wish to be limited to the particular embodiments shown and it is my intention to cover hereby all novel adaptations, modifications, and arrangements thereof which come within the practice of those skilled in the art to which the invention relates.

I claim:

1. A sheet molding compound comprising: a mat having two layers of long lengths of parallely oriented strand running at an angle to each other with a layer of randomly oriented glass strand positioned between said two parallely oriented strand layers and with strands of said layers touching each other at the points where said parallely oriented strands crossover randomly oriented strand, said layers being bonded by set organic binder that is limited generally to said crossover points, said mat being impregnated by a heat settable molding compound, and whereby a shifting between crossover points occurs during molding over projections to reduce wrinkling and prevent complete separation of the continuous strand layers.

2. A sheet molding compound comprising: a mat having a layer of long lengths of parallely oriented strand and a layer of randomly oriented glass strand and with strand of said layers touching each other at the points where said parallely oriented strands crossover randomly oriented strand, said layers being bonded by set organic binder that is limited generally to said crossover points, said mat being impregnated by a heat settable molding compound, and whereby a shifting between crossover points occurs during molding over projections to reduce wrinkling and prevent complete separation of the continuous strand layer.

3. The sheet molding compound of claim 2 wherein the molding compound comprises a thermosettable polyester resin.

* * * * *